(12) United States Patent
Haze et al.

(10) Patent No.: US 10,904,109 B2
(45) Date of Patent: Jan. 26, 2021

(54) REAL-TIME CLOUD-BASED RESOURCE REALLOCATION RECOMMENDATION GENERATION

(71) Applicant: SAP PORTALS ISRAEL LTD., Ra'anana (IL)

(72) Inventors: Oren Haze, Kfar Saba (IL); Yihezkel Schoenbrun, Ra'anana (IL)

(73) Assignee: SAP Portals Israel Ltd., Ra'anana (IL)

( * ) Notice: Subject to any disclaimer, the term of this patent is extended or adjusted under 35 U.S.C. 154(b) by 0 days.

(21) Appl. No.: 16/430,565

(22) Filed: Jun. 4, 2019

(65) Prior Publication Data

US 2020/0389375 A1    Dec. 10, 2020

(51) Int. Cl.
| | | |
|---|---|---|
| *H04L 12/24* | (2006.01) | |
| *G06N 20/00* | (2019.01) | |
| *H04L 29/08* | (2006.01) | |
| *G06F 9/50* | (2006.01) | |
| *G06Q 40/04* | (2012.01) | |

(52) U.S. Cl.
CPC ......... *H04L 41/5064* (2013.01); *G06F 9/505* (2013.01); *G06N 20/00* (2019.01); *H04L 41/5051* (2013.01); *H04L 41/5096* (2013.01); *H04L 67/32* (2013.01); *G06Q 40/04* (2013.01)

(58) Field of Classification Search
CPC ............. H04L 41/5064; H04L 41/5051; H04L 41/5096; H04L 67/32; G06N 20/00; G06F 9/505
USPC ....................................................... 709/226
See application file for complete search history.

(56) References Cited

U.S. PATENT DOCUMENTS

| | | | |
|---|---|---|---|
| 9,132,349 B2 | 9/2015 | Haze et al. | |
| 2013/0066703 A1 | 3/2013 | Razy et al. | |
| 2018/0331928 A1* | 11/2018 | Dave ........................ | G06N 5/04 |

OTHER PUBLICATIONS

U.S. Appl. No. 16/113,770, filed Aug. 27, 2018, Ramon-Gonen et al.
U.S. Appl. No. 16/126,118, filed Sep. 10, 2018, Haze et al.
U.S. Appl. No. 16/126,146, filed Sep. 10, 2018, Haze et al.
U.S. Appl. No. 16/126,144, filed Sep. 10, 2018, Haze et al.
An et al., "Resource Demand Forecasting Model Based on Dynamic Cloud Workload," Oct. 9, 2017, 12 pages.
García et al., "SLA-Driven Dynamic Cloud Resource Management," Future Generation Computer Systems, vol. 31, Feb. 2014, 33 pages.
Sarawathi et al., "Dynamic Resource Allocation Scheme in Cloud Computing," Procedia Computer Science, vol. 27, Jan. 2015, 7 pages.

(Continued)

*Primary Examiner* — Glenford J Madamba
(74) *Attorney, Agent, or Firm* — Fish & Richardson P.C.

(57) ABSTRACT

First resource utilization information for a first customer of a cloud platform and second resource utilization information for a second customer of the cloud platform are accessed. A first prediction regarding future resource utilization by the first customer and a second prediction regarding future resource utilization by the second customer are determined. A resource reallocation recommendation that recommends reallocating one or more resources between the first customer and the second customer is determined, based on the first prediction and the second prediction. The resource reallocation recommendation is provided.

18 Claims, 4 Drawing Sheets

(56) References Cited

OTHER PUBLICATIONS

Tseng et al., "Dynamic Resource Prediction and Allocation for Cloud Data Center Using the Multiobjective Genetic Algorithm," IEEE Systems Journal, vol. 12, Issue 2, Jun. 2018, 12 pages.

Wang et al., "Dynamic Cloud Resource Reservation via Cloud Brokerage," 2013 IEEE 33rd International Conference on Distributed Computing Systems, Aug. 2013, 33 pages.

Wikipedia.org [online], "Artificial Neural Network," Wikipedia reference, last edited on Apr. 18, 2019, [retrieved on Apr. 18, 2019], retrieved from: URL<https://en.wikipedia.org/wiki/Artificial_neural_network>, 39 pages.

Wikipedia.org [online], "Association Rule Learning," Wikipedia reference, last edited on Apr. 12, 2019, [retrieved on Apr. 18, 2019], retrieved from: URL<https://en.wikipedia.org/wiki/Association_rule_learning>, 11 pages.

Wikipedia.org [online], "Collaborative Filtering," Wikipedia reference, last edited on Mar. 9, 2019, [retrieved on Apr. 18, 2019], retrieved from: URL<https://en.wikipedia.org/wiki/Collaborative_filtering>, 9 pages.

Wikipedia.org [online], "td-idf," Wikipedia reference, last edited on Mar. 27, 2019, [retrieved on Apr. 18, 2019], retrieved from: URL<https://en.wikipedia.org/wiki/Tf%E2%80%93idf>, 7 pages.

\* cited by examiner

REAL-TIME CLOUD-BASED RESOURCE REALLOCATION RECOMMENDATION GENERATION

BACKGROUND

Different types of machine learning algorithms can be used by a computing system. For instance, collaborative filtering can be used to filter for patterns using techniques involving collaboration among multiple data sources. Association rule learning is a rule-based machine learning method for discovering relations between variables in large databases. Artificial neural networks can learn to perform tasks by considering examples, generally without being programmed with any task-specific rules. Term frequency-inverse document frequency approaches can determine how important a word is to a document in a collection.

SUMMARY

The present disclosure describes real-time cloud-based resource reallocation recommendation generation. In an implementation, first resource utilization information for a first customer of a cloud platform and second resource utilization information for a second customer of the cloud platform are accessed. A first prediction regarding future resource utilization by the first customer and a second prediction regarding future resource utilization by the second customer are determined. A resource reallocation recommendation that recommends reallocating one or more resources between the first customer and the second customer is determined, based on the first prediction and the second prediction. The resource reallocation recommendation is provided.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, resource-use prediction and exchange/reallocation recommendations can be generated for generally non-scalable resources. Second, resource recommendations can be automatically generated without manual input from human experts. Third, transparent information describing generation of resource recommendations can be provided to cloud-based computing system platform (or cloud platform) administrators and customers. Fourth, a resource exchange/reallocation marketplace can be provided to multiple cloud platform customers. Fifth, resource recommendations can be provided for various sizes and types of resources. Sixth, resource recommendations can be provided based on cloud platform customers that are similar to a given customer. Seventh, resource recommendations can be provided for cloud, on-premise, and hybrid cloud/on-premise customers. Eighth, resource recommendations can be provided to internal cost-center customers of an organization. Ninth, a recommendation can be provided to a cloud customer who over-purchases a particular resource, to make the over-purchased resource available to another customer who needs the same type of resource. Tenth, a recommendation can be provided to a cloud customer to obtain a resource that is predicted to be needed, from another customer who has an instance of the resource but is not likely to need the resource. Eleventh, resource recommendations can be generated while satisfying user privacy concerns. Twelfth, offering resource exchange brokerage services can provide a revenue stream for a cloud provider while increasing customer loyalty for the cloud provider. Thirteenth, a cloud platform can perform intelligent real-time resource recommendations to customers. Fourteenth, resource recommendations can be provided for cloud, on-premise, and hybrid cloud/on-premise customers within a company so that resources can be rebalanced between different lines of businesses within the company.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes real-time, cloud-based resource reallocation recommendation generation, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Cloud platform resource-utilization can fluctuate frequently, which can make it difficult for cloud customers to budget for and purchase an appropriate quantity of resources. For example, if a customer purchases more resources than are necessary, the customer can waste money. Conversely, if the customer does not purchase enough resources, unacceptable or less than optimum service levels may result. Some resources may scale relatively easier than other types of resources. For example, certain resource types, such as database nodes, may pose challenges for scalability, particularly dynamic scaling. However, even if resources are dynamically scalable, providing dynamic scaling for customers may incur a non-trivial and unacceptable cost to a cloud system provider. Accordingly, the cloud provider may choose to not allow certain types of resources to be dynamically scaled.

Some resource determination algorithms may require specific parameter tuning which may require manual analysis and specification by one or more human experts. Therefore, such algorithms may not be good candidates for automatic resource configuration. Additionally, some algorithms are not configured to handle transactions of varying sizes and formats, and can contribute to the generation of lower quality recommendations in some systems. Also, some algorithms do not provide transparency with respect to understanding how certain recommendations are generated.

For better resource use recommendation and configuration, a recommendation system of a cloud provider is described that can perform real-time resource matching and intelligent recommendations for resource exchange management. The recommendation system can recommend possible resource exchange options to specific customers/tenants or resource providers. The described recommendation system can provide a resource marketplace solution for improving resource usage prediction and facilitating exchange of resources between different cloud customers. In some implementations, the cloud provider can determine recommendations for cloud platform customers on the basis of historical usage data of a given customer and similar customers. For instance, the recommendation system can determine recommendations that target specific customers/tenants that are correlated to estimated/predicted resource usage and adapt in real-time to improve a customer's experience. In some cases, the recommendation system can also optimize resource management and resource expenditure. In some cases the recommendation system can use machine learning to help determine whether certain existing customer resources may not be needed in the future or whether extra resources may be needed.

A resource exchange can be, in some examples, a recommendation that one customer exchange one resource for another resource (such as, either a new resource newly offered by the cloud platform or a resource being relinquished by another customer). Typically, however, a resource exchange may be a resource reallocation where the recommendation system recommends that an unused or under-utilized resource from one customer is made available to another customer who has a greater need for the resource. The relinquished resource can be exchanged for a payment paid by the receiving customer. The cloud platform may receive a brokerage fee for facilitating the exchange/reallocation.

In addition to being used in a cloud-specific environment, the recommendation system can be used for on-premise and hybrid environments in which a customer has both cloud-based and on-premise resources. For example, a hybrid customer can use the recommendation system to reallocate resources between on-premise and cloud-based solutions, as well as between cloud sites. As another example, the recommendation system can be used internally by an organization that has multiple, different cost centers. For instance, larger organizations may treat different departments and cost centers as essentially different "internal customers". Without a recommendation or exchange system, internal cost centers that over purchase resources may remain burdened with a resource expenditure budget cost that may have been higher than necessary.

As a particular example, a human resources cost center may have over purchased a cloud-based resource and an internal research and development innovation center may require additional instances of the same resource. Rather than having the human resources cost center suffer from overspending and the research and development center purchase additional resources, the recommendation system can identify a match between the human resources department and the research and development center, and recommend a resource exchange. Accordingly, the cloud platform can reduce internal organizational costs within the company and enable an agile usage model.

The recommendation system can provide other advantages. For example, recommendations can be generated automatically, without the need for manual input or intervention by human experts. The cloud provider can also support recommendations for resource exchange transactions of various types and sizes, which can improve the quality of resource-related recommendations. In some instances, the recommendation system can provide support for General Data Protection Regulation (GDPR) (for example, using only transactional data and not personal user/customer data) for recommendation determination. Resource exchange services can be added to various types of cloud applications or systems, including cloud platform entitlements and infrastructure services, real-time offer management, predictive analytics, machine learning services, and others.

Additionally, the recommendation system can generate recommendations in a transparent manner, such as by including or providing access to explanations that describe how a specific recommendation was determined. Providing an ability for administrators to understand why and how a certain recommendation was generated can be important for a cloud-based system provider to better understand a customer base, for cloud-based system development and process improvement. Being able to identify reason(s) for creating certain recommendation(s) can influence system models and performance (for instance, fine tuning of Artificial Neural Network (ANN) algorithms and parameters).

As previously mentioned, some resources, such as disk space or memory, can generally be dynamically scaled, but other types of resources can present challenges for dynamic scaling. In some implementations, the recommendation system can perform real-time analytics and predictions for resources that don't always scale well or that scale less effectively than other types of resources. Resource use prediction can be useful for resources which cannot be dynamically scaled in a resource-effective manner, including discrete resources (such as, the addition or decommissioning of an additional database node).

By facilitating an exchange of resources among or within customers, as opposed to requiring customers to accept underused or unused resources, a resource recommendation model can increase customer loyalty with a cloud provider. The resource recommendation model can instill confidence in customers to reduce inhibitions and to spend more freely on resource expenditures, since customers know that overpurchasing mistakes can be less costly, due to the cloud provider's availability to act as a broker (for example, in real-time or non-real-time) to relieve them of a undesired resource burden. As a result, the platform provider can receive both general goodwill, an increase in loyalty, and financial consideration for facilitating the reallocation and exchange of customer resources as a service. Offering brokerage services can be considered an additional revenue stream for the cloud provider, since a brokerage fee can be applied to facilitate exchange transactions.

Figure 1:
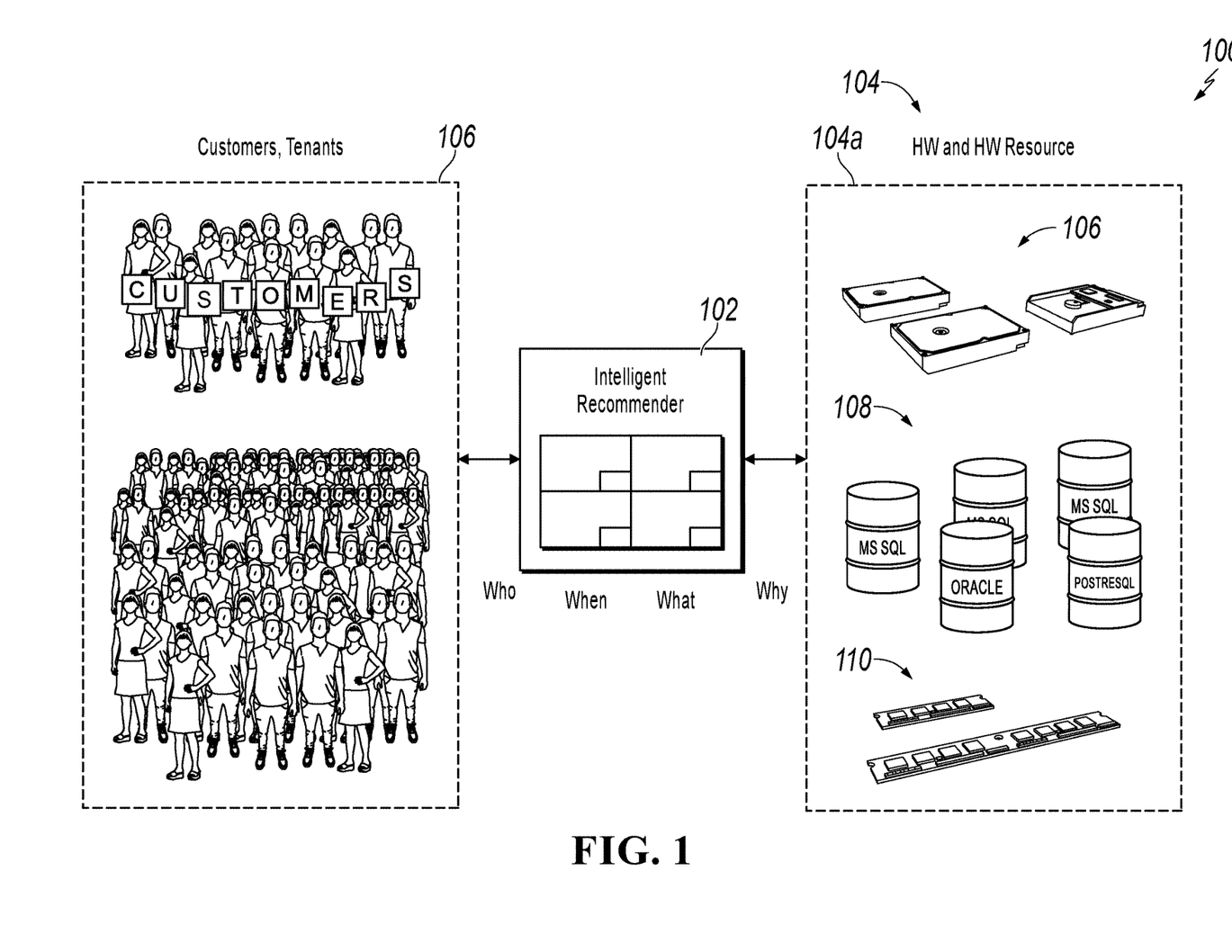
FIG. 1 is a high-level block diagram illustrating an example of a computing system in which an intelligent recommender of a cloud platform recommends resource exchanges and reallocations for customers, according to an implementation of the present disclosure.

FIG. 1 is a high-level block diagram illustrating an example of a computing system 100 in which an intelligent recommender 102 of a cloud platform recommends resource exchanges and reallocations for customers, according to an implementation of the present disclosure. Resource landscapes 104 for customers 106 (or tenants) of the cloud platform can be complex. For instance, for a given customer, a resource landscape 104a can include software applications 106, other configured resources 108 (for instance, database nodes), and hardware resources 110.

The customer can be a large organization that may use many different applications in the resource landscape 104a. In some implementations, the applications 106 can include business intelligence, customer relationship management, human resource management, enterprise resource management, business management, business to business (B2B), content management, manufacturing resource management, financial management, e-commerce, and supply chain management software. Additionally, the resource landscape 104a can include many different types of configured resources 108 (for instance, database node or server processes) and hardware resources 110 (for instance, memory, disk space, processors, or other types of hardware resources).

The resource landscape 104a can be frequently changing, where new applications, new resources, or new hardware can be added on a routine basis as existing resources become obsolete and are retired or deprecated. In-use resources can also change, where an in-use resource can be reconfigured, perhaps on-the-fly. In addition to the resource landscape 104a changing for a given customer, resource landscapes may frequently change for other customers in the customers 106.

When new customers are onboarded to the cloud platform, it can be challenging for a customer to know exactly which and how many of each type of resource to use. In this case, the customer may initially select too many or too few resources. In a given organization, there may be a general lack of knowledge regarding resource needs. Unplanned, unsophisticated, rushed, or random resource exchange or reallocation may be inefficient.

The intelligent recommender 102 can access resource utilization information for different customers 106 of the cloud platform, determine predictions for future resource utilization for the different customers 106, and, based on the predictions, determine resource reallocation recommendation(s) that recommend reallocating one or more resources between different customers 106. For example, a certain customer may currently have an instance of a certain type of resource, but a generated prediction for the customer may predict that the customer will not need the instance in the future. A prediction for another customer may predict that the other customer will likely have a use for the certain type of resource in the future. The intelligent recommender 102 can generate and present, to one or both of the two customers, a resource reallocation recommendation that recommends reallocating the instance from the certain customer to the other customer.

The intelligent recommender 102 can also recommend resource exchange/reallocation, by generating real-time, personalized, intelligent recommendations for the customers 106. The intelligent recommender 102 can make recommendations based on algorithms that are configured to recommend the right resource utilization, for the right customers, at the right time and place (for example, "who", "when", "what", and "why" recommendations). That is, even though resource use and configurations may be frequently changing, the intelligent recommender 102 can perform, at a given point-in-time, automatic resource exchange/reallocation recommendations, in real time.

Figure 2:
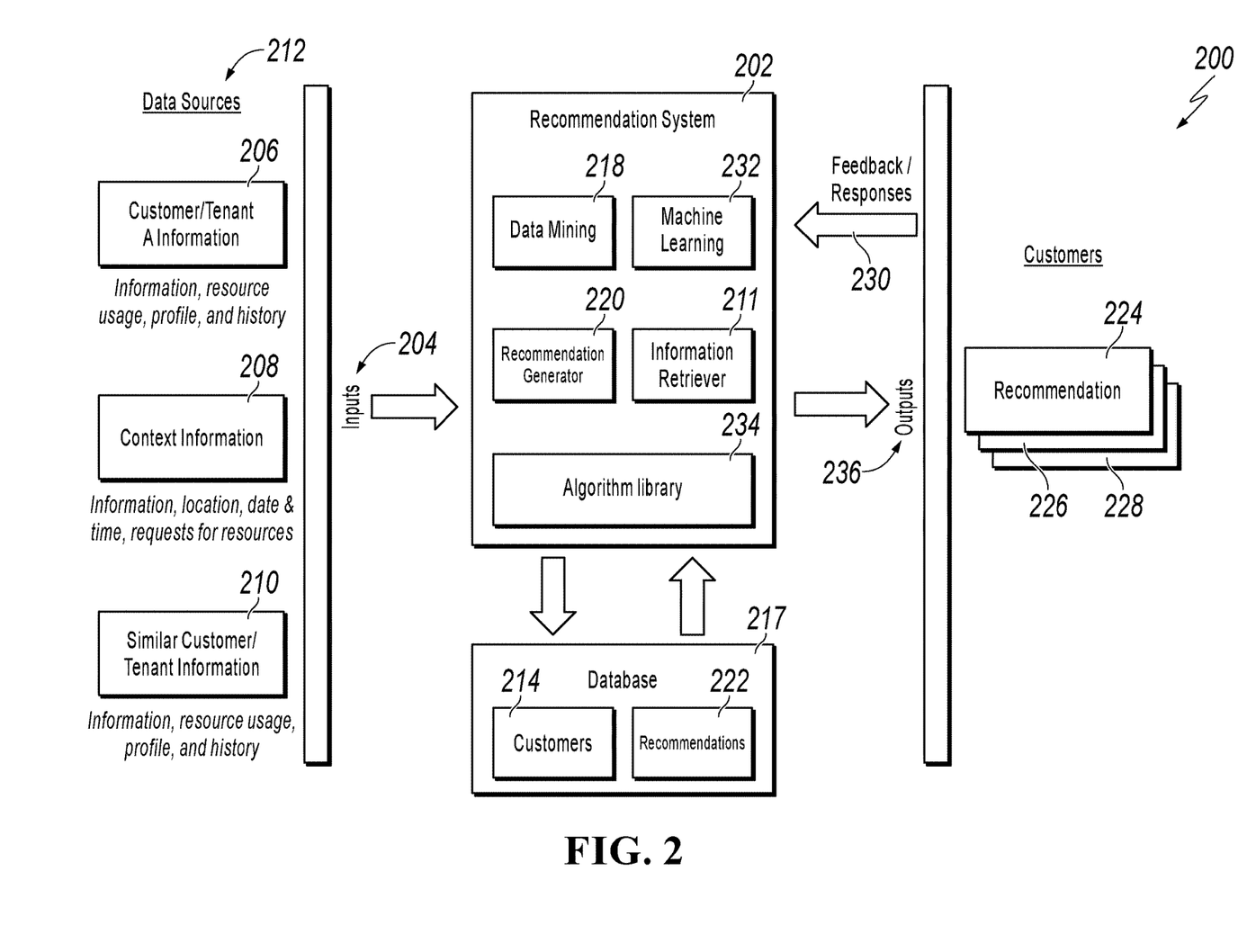
FIG. 2 is a block diagram illustrating an example of a computing system for resource exchange and reallocation recommendation, according to an implementation of the present disclosure.

FIG. 2 is a block diagram illustrating an example of a computing system 200 for resource exchange and reallocation recommendation, according to an implementation of the present disclosure. A recommendation system 202 can obtain a variety of inputs 204. The inputs 204 can include customer/tenant information 206 for a particular customer ("customer A"), context information 208, and similar customer/tenant information 210 for customers that are similar to the particular customer.

Some or all of the inputs 204 can be obtained by an information retriever 211. The information retriever 211 can periodically (for example, every minute, hour, or day) request the customer/tenant information 206, the context information 208, or the similar customer/tenant information 210 from a list of known data sources 212. As another example, the information retriever 211 can automatically receive the customer/tenant information 206, the context information 208, or the similar customer/tenant information 210 from the data sources 212. For example, the data sources 212 can be configured to periodically provide information to the recommendation system 202. As another example, the data sources 212 can be configured to provide updated information to the recommendation system 202 when the customer/tenant information 206 or the similar customer/tenant information 210 changes in a data source 212, due to new, changed, or deleted information. In addition to obtaining external customer/tenant information 206, context information 208, or similar customer/tenant information 210, the recommendation system 202 can obtain customer information 214 that is stored internally in a database 217 by the recommendation system 202 or another system at a same organization as the recommendation system 202.

In some implementations, the customer/tenant information 206 and the similar customer/tenant information 210 can include, for a respective customer, resource metadata that can include descriptions of resources that are currently installed or configured for the customer. Resource information can include information for cloud platform resources and other resources (such as on-premise resources). Resource usage information can describe current and historical resource use for the customer, including use of applications, servers, hardware, and other resources. Customer profile information can include an overview of customer characteristics, such as a line of business, types of transactions, or types of data used by the customer. Customer history information can include a history of resource installations and configurations, a history of resource decommissions, a history of resource exchange/reallocation transactions, and a history of resource exchange/reallocation recommendation interactions and feedback. Other resource information can include information for planned future resource installations, configurations, decommissions, or relinquishments. The customer/tenant information 206 and the similar customer/tenant information 210 received by the recommendation system 202 can be information for which the recommendation system 202 has been permitted to obtain, by a respective customer. In some implementations, the customer/tenant information 206 or the similar customer/tenant information 210 can include other information consistent with this disclosure.

Context information 208 can include context associated with obtained customer/tenant information 206 or similar customer/tenant information 210, such as a date, time, or location of data capture. Date or time information can represent particular date or time periods, such as afternoon-time, morning-time, weekday, weekend, a particular season, end-of-quarter, or end-of-year. For example, location information can correspond to a customer's location such as a city, a state, or a country. Other context information can include historical usage, or known fluctuations or events (e.g., holidays or events that may affect resource utilization for an ecommerce customer, for example).

In some implementations, obtained customer/tenant information 206 and similar customer/tenant information 210 can be stored by the recommendation system 202 in the customer data 214. In some implementations, context information 208 that may have been associated with the customer/tenant information 206 or the similar customer/tenant information 210 can be stored in the database 217 and linked to respective associated data.

In some implementations, a data mining component 218 can analyze the customer information 214 to determine resource utilization predictions for various customers, based on past customer resource utilization and on changes in resource utilization for customers who were similar to respective customers (at other points in time, for example). For example, the data mining component 218 can determine customer information 214 for customers that are similar to a given customer, and use the similar customer information to determine predictions for a given customer. For instance, resource usage information for customers with a same (or similar) customer profile can be identified. Similar customers may have been similar to a customer in the past, and may have undergone a certain trajectory of resource use. A prediction can predict that the customer may undergo a similar resource use trajectory in the future. As part of a platform provider with many customers with unique knowledge of multiple customers' historical usages, the recommendation generator 220 can take into account historical fluctuations of all relevant customers.

The recommendation generator 220 can analyze the generated predictions for purposes of generating one or more resource exchange/reallocation recommendations for one or more customers. For instance, the recommendation generator 220 can generate a resource reallocation or exchange recommendation by matching a prediction of a resource excess with a prediction of a resource need. Although predicted needs and predicted excesses are described, the recommendation generator 220 can also identify and match a current resource excess with a current resource need. As an example, a first customer may currently have one or more instances of a first type of resource but may, according to a generated prediction, not have a future need for all of the instances of the resource. A second customer, who does not currently have the resource (or who has a certain amount of the resource), may have a predicted need for the resource (or a larger amount of the resource). The recommendation generator 220 can generate a resource reallocation recommendation that recommends reallocating at least one instance of the resource from the first customer to the second customer.

In some implementations, the recommendation generator 220 uses a machine learning component 232 for generating predictions or recommendations. In some implementations, multiple machine learning models are used. Machine learning models or algorithms can include Collaborative Filtering (CF), Association Rules (AR), Artificial Neural Networks (ANN), Term Frequency-Inverse Document Frequency (TF-IDF), or Optimized Recommendations based Basket Size (ORBS). Algorithm code or parameters can be stored in an algorithm library 234. When multiple algorithms (machine learning or other types) are used, the recommendation generator 220 can combine several recommendation approaches together and aggregate results. Algorithm outputs can be aggregated to determine final recommendations, for example. The algorithm library 234 can include other types of algorithms. For example, pattern-matching algorithms or other mathematical algorithms can be accessed by recommendation system 202 components from the algorithm library 234.

In some implementations, the data mining component 218 can determine resources that are going to be retired or eliminated at a later date. In these cases, the data mining component 218 can identify replacement resources that include the same functionality, or other resources that have been previously identified as replacement resources. A replacement resource can be a resource that has been identified as likely unnecessary for some other customer. In some implementations, replacement resource information can be included in a subsequently generated recommendation, to be presented to users who are still using the to-be-retired resources. A resource that is planned to be retired can be offered to another customer, in some examples. Other recommendation examples are described in following figures. Determined recommendations can be stored as recommendations 222 in the database 217.

Generated recommendations 222 can be presented to customers(s) (for example, as presented recommendations 224, 226, and 228). Recommendations can be sent to users who have a particular role within a customer organization. In some implementations, presented recommendations 224, 226, and 228 can include a link or other mechanism that enables the customer to launch some type of processing (for instance, using a script) for an installation of a recommended resource or for decommissioning of a to-be-relinquished resource. In some implementations, recommendations 224, 226, and 228 can be presented in different channels, such as in a dashboard, in email, or on various types of user devices (such as, mobile devices, desktop devices, or other computing devices or messaging platforms). In some implementations, recommendations 224, 226, and 228 for a resource exchange or reallocation can be presented to a customer user while the user is using a particular application, while in a certain location, at a next login time, or upon other scheduling.

The data mining component 218, information retriever 211, and recommendation generator 220 can perform processing at various times and in response to various triggers. In general, processing by the recommendation system 202 can be ongoing, either periodic or event-driven (for example, to account for potentially frequent changes in the customer/tenant information 206 or the similar customer/tenant information 210). Recommendation system 202 processing can be performed periodically, such as every minute, every hour, every day, or in response to changed data or newly received data. As described previously, a large customer may use many resources, resulting in dynamic customer resource information data sets. Without frequent resource exchange/reallocation recommendation generation, customers may not be using best-suited resources for their needs or an organization's benefit. In some implementations, recommendation system 202 processing can be performed in batch, such as by periodically obtaining customer/tenant information 206 and similar customer/tenant information 210, and automatically generating new recommendations based on a current state of the database 217. As another example, the recommendation system 202 can generate recommendations for particular customers based on activities performed by a given customer, such as the customer submitting a resource recommendation request or the customer making a resource-related change.

After recommendations 224, 226, and 228 are presented, feedback/responses 230 can be provided to the recommendation system 202. Feedback/responses 230 can include, for example, indications of whether recommendations were acted upon, how long to respond, or whether presented recommendations 224, 226, or 228 were dismissed without being acted upon. For recommendations for which a recommended resource was installed, the feedback 230 can include usage information for the installed resource so that the recommendation system 202 can track accuracy of the recommendation, such as to determine whether a resource that was predicted to be needed was actually used (or to what extent the resource is used), post installation. In some implementations, the feedback 230 can be used by the machine learning engine 232 to tailor future recommendations. For example, algorithm weights or parameters can be adjusted.

When the feedback/responses 230 indicate acceptance of a recommendation by all parties associated with the recommendation, the recommendation system 202 can initiate a reallocation or resource exchange, in accordance with the recommendation. For example, a message can be sent to an administrator or other user(s) to initiate a resource reallocation process. As another example, an electronic message can be sent to a system that automatically changes ownership of a resource from a selling customer to a buying customer. Funds can be credited to a selling customer and a buying customer can be charged. Applicable broker fees can be applied before charges and credits are applied.

As an example, certain types of recommendations that are acted upon at a higher-frequency than other types of recommendations can be provided more often than for other recommendation types. As another example, if less than a certain predefined percentage of users accept a recommendation for a particular type of resource exchange/reallocation, recommendations of that type can be reduced or eliminated in the future. As a specific example, if a less than two percent of users act upon a certain type of recommendation, the machine learning engine 232 can send information to the recommendation generator 220 so that type of recommendation is not recommended (or recommended even less frequently or only recommended based on particular criteria) in the future. As another example, if recommendations of another type are accepted at a rate of 90%, the machine learning engine 232 can send information to the recommendation generator 220 so that recommendations of that type are recommended to more customers more often.

Other types of outputs 236 can be produced by the recommendation system 202. For example, the recommendation system 202 can expose customer information 214 and recommendations 222 to privileged users, for analysis and understanding of customer resource landscapes and recommendation history. In some implementations, stored recommendations 222 can include information on recommendation acceptance rates. Exposed information from the database 217 can be provided in report or data feed form (for example, for analyst viewing or processing by system(s)).

Figure 3:
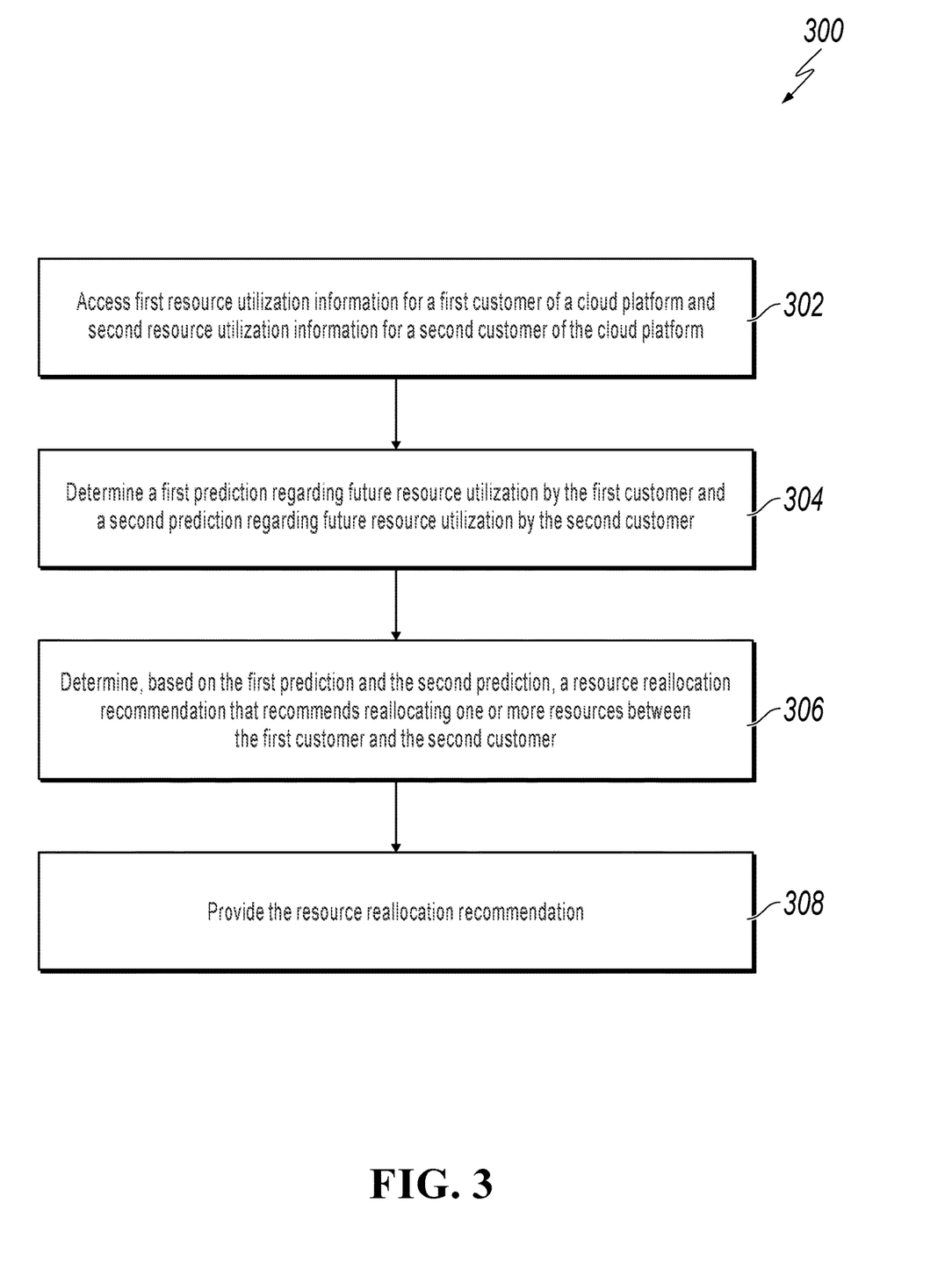
FIG. 3 is a flowchart illustrating an example of a computer-implemented method for real-time cloud-based resource reallocation recommendation generation, according to an implementation of the present disclosure.

FIG. 3 is a flowchart illustrating an example of a computer-implemented method 300 for real-time cloud-based resource reallocation recommendation generation, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, first resource utilization information for a first customer of a cloud platform and second resource utilization information for a second customer of the cloud platform are accessed. In some implementations, resource utilization for a given customer includes resource utilization information for customers that are similar to the given customer. Resource utilization information can include information about resources in use, an amount of use, a schedule a use, a pattern of use, or other usage characteristics. From 302, method 300 proceeds to 304.

At 304, a first prediction regarding future resource utilization by the first customer and a second prediction regarding future resource utilization by the second customer are determined. From 304, method 300 proceeds to 306.

At 306, a resource reallocation recommendation that recommends reallocating one or more resources between the first customer and the second customer is determined, based on the first prediction and the second prediction. The resource reallocation recommendation can be generated in response to a trigger, such as a change in resource utilization information, a change in other customer information, or a start of a periodic interval at which to automatically determine whether any recommendations should be made. In some implementations, a recommendation engine uses one or more machine learning models to generate the resource reallocation recommendation. The first customer can currently have an instance of a certain type of resource and the first prediction can predict that the first customer will likely not need the instance in the future. The second prediction may predict that the second customer will likely have a use for the certain type of resource in the future. The resource reallocation recommendation can recommend the reallocating of the instance from the first customer to the second customer. The recommendation can include a reallocation price. For instance, the first customer can be offered compensation for relinquishing the instance and the second customer can be informed that the relinquished resource can be obtained at a certain cost. In some implementations, generating of the recommendation includes determining a broker fee to be applied to one or both of the first customer and the second customer if the recommended reallocation occurs. In some implementations, a recommendation is an offer for an ability to partake in a resource purchase with another customer (as a resource buyer or seller), with a platform acting as a broker. A selling customer can recoup costs of an unused or under-used resource. A buying customer can receive a discount or other credit for purchasing a resource from another customer, as compared to purchasing a resource directly from the platform. In some implementations, a recommendation has an expiration time, by which customers to which the recommendation is to be presented have to respond.

As a particular example, if the second customer is predicted to require an additional resource, and if the first customer is predicted to financially benefit from offloading an already purchased resource that may no longer be needed, a recommendation can be provided to the second customer as an offer for an ability to purchase the resource from the first customer for a cost of $X+$a, with "$X" representing a market cost and "$a" representing a broker fee charged by the platform. The platform provider can provide a recommendation to the second customer as an offer for an ability to sell the resource to the first customer for a price, for example, of $X−$a, as an opportunity to recoup a substantial amount of an original resource purchase price. A total purchase price of $X+$a can be less than a cost of purchasing the resource directly from the provider, thus providing an incentive for the second customer to purchase the resource from the first customer. From 306, method 300 proceeds to 308.

At 308, the resource reallocation recommendation is provided. The resource reallocation recommendation can be provided to the first customer and the second customer. The provided recommendation can include information about an applicable broker fee. In some implementations, the resource reallocation recommendation is formatted differently for the first customer and the second customer. For example, when the recommendation is for the first customer to relinquish a resource and to have that resource provided to the second customer, the recommendation provided to the first customer can be worded as a recommendation to relinquish the resource, and receive compensation. The recommendation provided to the second customer can be to receive the resource from the first customer for a particular price. The first and second customers can remain anonymous (in that the customer providing a resource is not aware of who may receive the resource and the receiving customer is not aware of who provided the resource). In some implementations, feedback related to the resource reallocation recommendation can be received and a recommendation engine can be adjusted to improve generation of future resource reallocation recommendations. After the recommendation is provided, a first acceptance of the resource reallocation recommendation from the first customer and a second acceptance of the resource reallocation recommendation from the second customer can be received. In response to receiving both the first acceptance and the second acceptance, a recommended resource reallocation can occur. For example, an instance of a resource can be reallocated from the first customer to the second customer, in response to receiving the first acceptance and the second acceptance.

In some implementations, if one of the first customer and the second customer provides an acceptance but the other customer declines, one or more other resource reallocations can be generated. For example, a new resource reallocation can be generated for the accepting customer, but that involves a different customer than the declining customer. As another example, a new resource reallocation recommendation can be generated for the declining customer. In some implementations, a declination includes reasons for declining, and a subsequent recommendation can be generated to address the declination reasons (so as to make the subsequent recommendation more appealing to the customer who declined a previous recommendation). After 308, method 300 stops.

Figure 4:
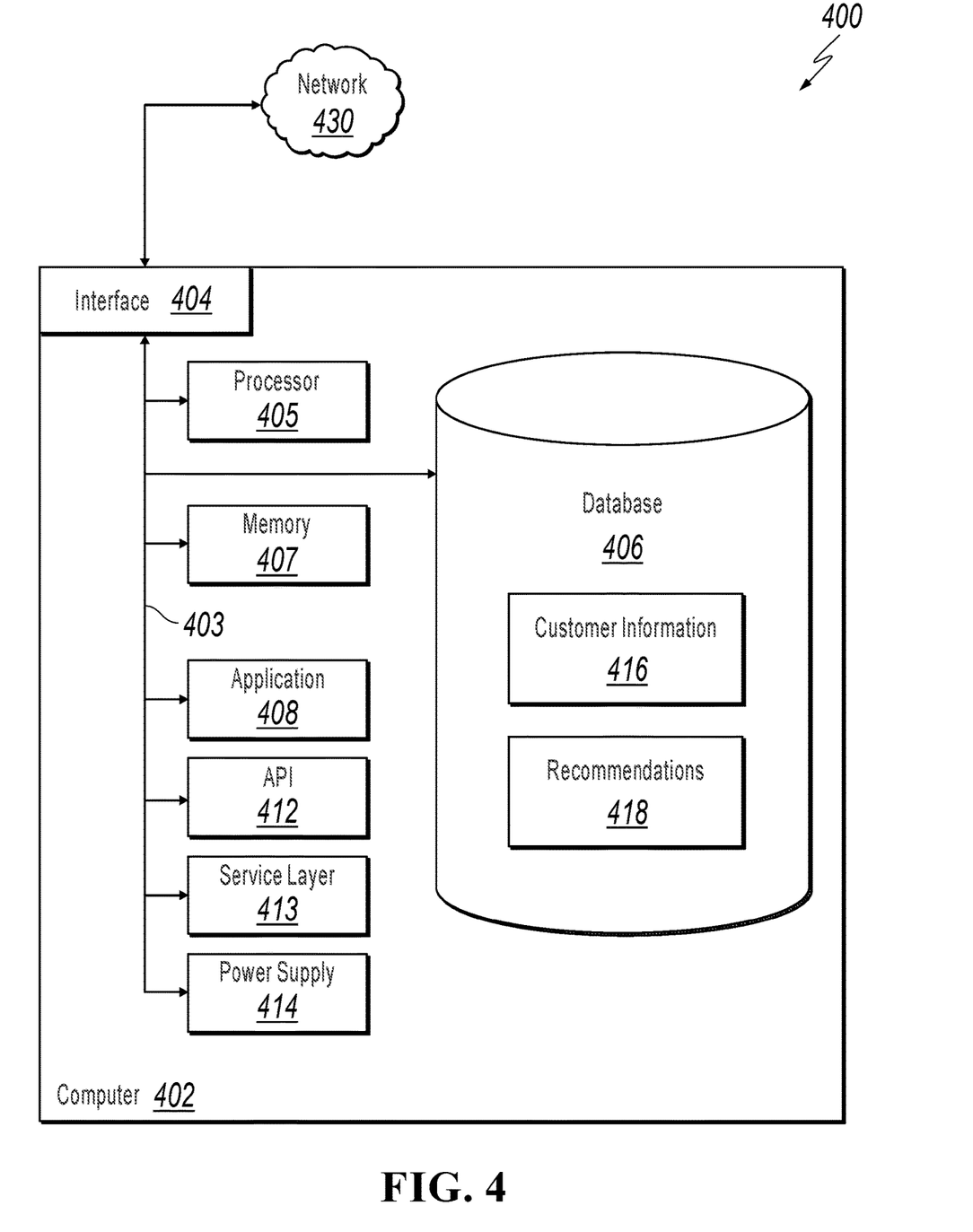
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud-computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. As illustrated, the Database 406 holds the previously described customer information 416 and recommendations 418.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method comprises: accessing first resource utilization information for a first customer of a cloud platform and second resource utilization information for a second customer of the cloud platform; determining a first prediction regarding future resource utilization by the first customer and a second prediction regarding future resource utilization by the second customer; determining, based on the first prediction and the second prediction, a resource reallocation recommendation that recommends reallocating one or more resources between the first customer and the second customer; and providing the resource reallocation recommendation.

The foregoing and other described implementations can each, optionally, include one or more of the following features:

A first feature, combinable with any of the following features, wherein the resource reallocation recommendation is generated in response to a trigger.

A second feature, combinable with any of the previous or following features, wherein the trigger comprises one of a change in the first resource utilization information or the second resource utilization or a start of a periodic interval at which to automatically generate the resource reallocation recommendation.

A third feature, combinable with any of the previous or following features, further comprising: receiving feedback related to the resource reallocation recommendation; and adjusting a recommendation engine to improve generation of future resource reallocation recommendations.

A fourth feature, combinable with any of the previous or following features, wherein the recommendation engine uses one or more machine learning models to generate the resource reallocation recommendation.

A fifth feature, combinable with any of the previous or following features, wherein providing the resource reallocation recommendation comprises providing the resource reallocation recommendation to the first customer and the second customer.

A sixth feature, combinable with any of the previous or following features, wherein the first customer has an instance of a first type of resource, the first prediction comprises predicting that the first customer will not need the instance of the first type of resource in the future, the second prediction comprises predicting that the second customer will have use for the first type of resource in the future, and the resource reallocation recommendation recommends reallocating the instance of the first type of resource from the first customer to the second customer.

A seventh feature, combinable with any of the previous or following features, further comprising receiving a first acceptance of the resource reallocation recommendation from the first customer and a second acceptance of the resource reallocation recommendation from the second customer.

An eighth feature, combinable with any of the previous or following features, further comprising reallocating the instance of the first type of resource from the first customer to the second customer, in response to receiving the first acceptance and the second acceptance.

A ninth feature, combinable with any of the previous or following features, further comprising determining a broker fee for reallocating the instance of the first type of resource from the first customer to the second customer and charging the broker fee to at least one of the first customer and the second customer.

A tenth feature, combinable with any of the previous or following features, wherein the first resource utilization comprises resource utilization information for customers that are similar to the first customer and the first prediction is determined based on the resource utilization information for the first customer and the resource utilization information for customers that are similar to the first customer.

In a second implementation, a non-transitory, computer-readable medium stores one or more instructions executable by a computer system to perform operations, the operations comprising: accessing first resource utilization information for a first customer of a cloud platform and second resource utilization information for a second customer of the cloud platform; determining a first prediction regarding future resource utilization by the first customer and a second prediction regarding future resource utilization by the second customer; determining, based on the first prediction and the second prediction, a resource reallocation recommendation that recommends reallocating one or more resources between the first customer and the second customer; and providing the resource reallocation recommendation.

The foregoing and other described implementations can each, optionally, include one or more of the following features:

A first feature, combinable with any of the following features, wherein the resource reallocation recommendation is generated in response to a trigger.

A second feature, combinable with any of the previous or following features, wherein the trigger comprises one of a change in the first resource utilization information or the second resource utilization or a start of a periodic interval at which to automatically generate the resource reallocation recommendation.

A third feature, combinable with any of the previous or following features, further comprising: receiving feedback related to the resource reallocation recommendation; and adjusting a recommendation engine to improve generation of future resource reallocation recommendations.

A fourth feature, combinable with any of the previous or following features, wherein the recommendation engine uses one or more machine learning models to generate the resource reallocation recommendation.

A fifth feature, combinable with any of the previous or following features, wherein providing the resource reallocation recommendation comprises providing the resource reallocation recommendation to the first customer and the second customer.

A sixth feature, combinable with any of the previous or following features, wherein the first customer has an instance of a first type of resource, the first prediction comprises predicting that the first customer will not need the instance of the first type of resource in the future, the second prediction comprises predicting that the second customer will have use for the first type of resource in the future, and the resource reallocation recommendation recommends reallocating the instance of the first type of resource from the first customer to the second customer.

A seventh feature, combinable with any of the previous or following features, further comprising receiving a first acceptance of the resource reallocation recommendation from the first customer and a second acceptance of the resource reallocation recommendation from the second customer.

An eighth feature, combinable with any of the previous or following features, further comprising reallocating the instance of the first type of resource from the first customer to the second customer, in response to receiving the first acceptance and the second acceptance.

A ninth feature, combinable with any of the previous or following features, further comprising determining a broker fee for reallocating the instance of the first type of resource from the first customer to the second customer and charging the broker fee to at least one of the first customer and the second customer.

A tenth feature, combinable with any of the previous or following features, wherein the first resource utilization comprises resource utilization information for customers that are similar to the first customer and the first prediction is determined based on the resource utilization information for the first customer and the resource utilization information for customers that are similar to the first customer.

In a third implementation, a computer-implemented system, comprises one or more computers and one or more computer memory devices interoperably coupled with the one or more computers and having tangible, non-transitory, machine-readable media storing one or more instructions that, when executed by the one or more computers, perform one or more operations, the operations comprising: accessing first resource utilization information for a first customer of a cloud platform and second resource utilization information for a second customer of the cloud platform; determining a first prediction regarding future resource utilization by the first customer and a second prediction regarding future resource utilization by the second customer; determining, based on the first prediction and the second prediction, a resource reallocation recommendation that recommends reallocating one or more resources between the first customer and the second customer; and providing the resource reallocation recommendation.

The foregoing and other described implementations can each, optionally, include one or more of the following features:

A first feature, combinable with any of the following features, wherein the resource reallocation recommendation is generated in response to a trigger.

A second feature, combinable with any of the previous or following features, wherein the trigger comprises one of a change in the first resource utilization information or the second resource utilization or a start of a periodic interval at which to automatically generate the resource reallocation recommendation.

A third feature, combinable with any of the previous or following features, further comprising: receiving feedback related to the resource reallocation recommendation; and adjusting a recommendation engine to improve generation of future resource reallocation recommendations.

A fourth feature, combinable with any of the previous or following features, wherein the recommendation engine uses one or more machine learning models to generate the resource reallocation recommendation.

A fifth feature, combinable with any of the previous or following features, wherein providing the resource reallocation recommendation comprises providing the resource reallocation recommendation to the first customer and the second customer.

A sixth feature, combinable with any of the previous or following features, wherein the first customer has an instance of a first type of resource, the first prediction comprises predicting that the first customer will not need the instance of the first type of resource in the future, the second prediction comprises predicting that the second customer will have use for the first type of resource in the future, and the resource reallocation recommendation recommends reallocating the instance of the first type of resource from the first customer to the second customer.

A seventh feature, combinable with any of the previous or following features, further comprising receiving a first acceptance of the resource reallocation recommendation from the first customer and a second acceptance of the resource reallocation recommendation from the second customer.

An eighth feature, combinable with any of the previous or following features, further comprising reallocating the instance of the first type of resource from the first customer to the second customer, in response to receiving the first acceptance and the second acceptance.

A ninth feature, combinable with any of the previous or following features, further comprising determining a broker fee for reallocating the instance of the first type of resource from the first customer to the second customer and charging the broker fee to at least one of the first customer and the second customer.

A tenth feature, combinable with any of the previous or following features, wherein the first resource utilization comprises resource utilization information for customers that are similar to the first customer and the first prediction is determined based on the resource utilization information for the first customer and the resource utilization information for customers that are similar to the first customer.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   accessing first resource utilization information for a first customer of a cloud platform and second resource utilization information for a second customer of the cloud platform;
   determining a first prediction regarding future resource utilization by the first customer and a second prediction regarding future resource utilization by the second customer;
   determining, based on the first prediction and the second prediction, a resource reallocation recommendation that recommends reallocating one or more resources between the first customer and the second customer;
   providing the resource reallocation recommendation;
   receiving, in response to the resource reallocation recommendation, a first acceptance of the resource reallocation recommendation from the first customer and a second acceptance of the resource reallocation recommendation from the second customer; and
   reallocating the instance of the first type of resource from the first customer to the second customer, in response to receiving the first acceptance and the second acceptance.

2. The computer-implemented method of claim 1, wherein the resource reallocation recommendation is generated in response to a trigger.

3. The computer-implemented method of claim 2, wherein the trigger comprises one of a change in the first resource utilization information or the second resource utilization or a start of a periodic interval at which to automatically generate the resource reallocation recommendation.

4. The computer-implemented method of claim 1, further comprising:
   receiving feedback related to the resource reallocation recommendation; and
   adjusting a recommendation engine to improve generation of future resource reallocation recommendations.

5. The computer-implemented method of claim 4, wherein the recommendation engine uses one or more machine learning models to generate the resource reallocation recommendation.

6. The computer-implemented method of claim 1, wherein providing the resource reallocation recommendation comprises:
   providing the resource reallocation recommendation to the first customer and the second customer.

7. The computer-implemented method of claim 1, wherein:
   the first customer has an instance of a first type of resource;

the first prediction comprises predicting that the first customer will not need the instance of the first type of resource in the future;

the second prediction comprises predicting that the second customer will have use for the first type of resource in the future; and the resource reallocation recommendation recommends reallocating the instance of the first type of resource from the first customer to the second customer.

8. The computer-implemented method of claim 1, further comprising:

determining a broker fee for reallocating the instance of the first type of resource from the first customer to the second customer; and charging the broker fee to at least one of the first customer and the second customer.

9. The computer-implemented method of claim 1, wherein the first resource utilization comprises resource utilization information for customers that are similar to the first customer and the first prediction is determined based on the resource utilization information for the first customer and the resource utilization information for customers that are similar to the first customer.

10. A non-transitory, computer-readable medium storing one or more instructions executable by a computer system to perform operations comprising:

accessing first resource utilization information for a first customer of a cloud platform and second resource utilization information for a second customer of the cloud platform;

determining a first prediction regarding future resource utilization by the first customer and a second prediction regarding future resource utilization by the second customer;

determining, based on the first prediction and the second prediction, a resource reallocation recommendation that recommends reallocating one or more resources between the first customer and the second customer;

providing the resource reallocation recommendation;

receiving, in response to the resource reallocation recommendation, a first acceptance of the resource reallocation recommendation from the first customer and a second acceptance of the resource reallocation recommendation from the second customer; and reallocating the instance of the first type of resource from the first customer to the second customer, in response to receiving the first acceptance and the second acceptance.

11. The computer-readable medium of claim 10, wherein the resource reallocation recommendation is generated in response to a trigger.

12. The computer-readable medium of claim 11, wherein the trigger comprises one of a change in the first resource utilization information or the second resource utilization or a start of a periodic interval at which to automatically generate the resource reallocation recommendation.

13. The computer-readable medium of claim 10, the operations further comprising:

receiving feedback related to the resource reallocation recommendation; and adjusting a recommendation engine to improve generation of future resource reallocation recommendations.

14. The computer-readable medium of claim 13, wherein the recommendation engine uses one or more machine learning models to generate the resource reallocation recommendation.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

accessing first resource utilization information for a first customer of a cloud platform and second resource utilization information for a second customer of the cloud platform;

determining a first prediction regarding future resource utilization by the first customer and a second prediction regarding future resource utilization by the second customer;

determining, based on the first prediction and the second prediction, a resource reallocation recommendation that recommends reallocating one or more resources between the first customer and the second customer;

providing the resource reallocation recommendation;

receiving, in response to the resource reallocation recommendation, a first acceptance of the resource reallocation recommendation from the first customer and a second acceptance of the resource reallocation recommendation from the second customer; and reallocating the instance of the first type of resource from the first customer to the second customer, in response to receiving the first acceptance and the second acceptance.

16. The computer-implemented system of claim 15, wherein the resource reallocation recommendation is generated in response to a trigger.

17. The computer-implemented system of claim 16, wherein the trigger comprises one of a change in the first resource utilization information or the second resource utilization or a start of a periodic interval at which to automatically generate the resource reallocation recommendation.

18. The computer-implemented system of claim 15, the operations further comprising:

receiving feedback related to the resource reallocation recommendation; and adjusting a recommendation engine to improve generation of future resource reallocation recommendations.

* * * * *